July 11, 1933.   E. B. REDMAN   1,917,900
GLARE SHIELD FOR SPECTACLES
Filed Aug. 26, 1931

INVENTOR.
Edward B. Redman
BY Joseph B. Gardner
His ATTORNEY.

Patented July 11, 1933

1,917,900

UNITED STATES PATENT OFFICE

EDWARD B. REDMAN, OF BERKELEY, CALIFORNIA

GLARE SHIELD FOR SPECTACLES

Application filed August 26, 1931. Serial No. 559,514.

The invention relates to shields designed for detachable positioning on a pair of vision or like spectacles so that the wearer of the latter will not be required when desirous of using the spectacles under conditions exposing the wearer to the glare of the sun or other light, et cetera, to wear in addition to the spectacles, an independently carried pair of spectacles designed mainly for eliminating such glare.

An object of the invention is to provide a device of the character described which is so constructed that no metal parts or parts independent of the shield members are required for effecting engagement of the device with the spectacles.

Another object of the invention is to provide a device of the character described which, while being adjustable for attachment to any style or size of spectacles, requires in its entire construction, besides the shield members, but the use of a simple rubber band or the like.

A further object of the invention is to provide a device of the character described in which the cost of manufacture and production will be reduced to a minimum.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
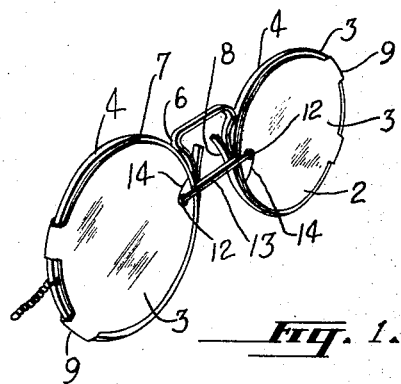
Figure 1 is a perspective view of the device of my invention operatively disposed on a pair of spectacles.

As illustrated in the drawing, the device 2 of my invention is arranged for use on a pair of spectacles 3 comprising a pair of lenses 4 here shown mounted in a frame 6 including the lens rims 7 and the nose bridge 8. The device 2 of my invention, as clearly shown in Figure 2, comprises a pair of shielding lenses or members 3 preferably of like construction and formed of celluloid or other transparent material colored or otherwise made to provide a non-glare viewing medium. The members 3 are preferably of the same general shape and size as the spectacles lenses 4 so that when operatively disposed thereon they will appear as a unitary and harmonious part of the spectacles.

Figure 2:
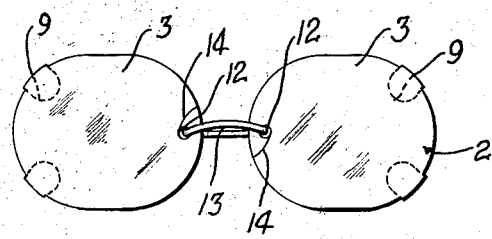
Figure 2 is a front elevation of the device.
Figure 3:
Figure 3 is a plan view of the device.

Formed as an integral part of the members 3 and extending from the edges thereof are one or more tongues 9 which are bent rearwardly and inwardly so that their free portion will overlie the rear face of the members, preferably in spaced relation thereto as clearly shown in Figures 2 and 3. Each member as here shown is provided with two tongues which are located near the outer end portion of the members with preferably one tongue above and the other tongue below the center. In the operative positioning of the members the tongues are arranged to fit over the outer end portions of the spectacles and thereby confine the lenses or frame of the latter between the tongues and the face of the members.

Figure 4:
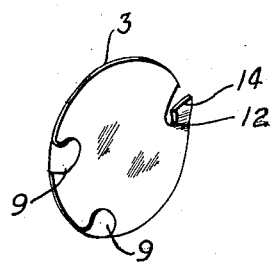
Figure 4 is a perspective view looking at the rear of one of the shield members with a portion bent out of normal shape.

Connection of the members so as to firmly retain the tongues against the spectacles is here arranged to be effected in a very simple and effective manner. Formed in each of the members at the center of the inner end portion thereof is an opening 12 arranged for the reception of a band 13 of elastic or the like. In order to permit the ready insertion of the band in the openings, the member is provided with a slit 14 between the opening and the adjacent edge of the member so that by bending the portions on opposite sides of the slit in opposite directions the slit may be opened, as indicated in Figure 4, to permit the band to be moved therethrough. After the band is inserted the slit portions will resume their coplanar relation due to the natural resilience of the material of which the members are formed. Preferably the inner edge of the slit is disposed at the inner end of the opening so that the band in the operative positioning of the device may press against the unbroken outer edge of the opening. It will thus be clear that should the elastic band become broken, a new band may be instantly and conveniently inserted.

In positioning the device on the spectacles, one member is usually placed over the front of a lens and the tongues thereof slipped over the edge of the lens. The other member is then likewise positioned over the front of the other lens and then with the band stretched the tongues of the latter member are likewise slipped in position. The band it will be understood is of such length that when the shield members, together with the tongues, are operatively disposed on the spectacles, the band will be still taut so that the desired positioning of the members will be firmly maintained. The firm retention of the device is also enhanced by reason of the fact that the band is disposed at the center of the members, while the tongues are on opposite sides of the center. It will also be seen that by reason of the location of the tongues, the device will not interfere with the bows which are ordinarily positioned at the center of the outer end portions of the spectacles.

As will be readily understood, to remove the device it is merely necessary to slightly stretch the band to permit the disengagement of the readily yielding tongues.

I claim:

1. In a glare shield for spectacles, a pair of transparent shielding members each having a substantially closed opening in the inner end portion thereof and a slit connecting said opening and an adjacent edge of the member, a continuous elastic band engaging in said openings, and yielding tongues formed integral with said members extending from the edges of the outer end portions thereof and arranged to hook over the corresponding end portions of the spectacle lenses.

2. In a glare shield for spectacles, a pair of transparent shielding members each having tongues positioned on opposite sides of the center of the outer end portion of the member and each having a substantially closed opening in the inner end portion thereof, each of said members being provided with a slit connecting the outer edges of said opening with the inner end of the members, and a resilient band in said openings and cooperating with said tongues for holding the members operatively disposed on the spectacles.

In testimony whereof, I have hereunto set my hand at Oakland, California, this 14 day of August, 1931.

EDWARD B. REDMAN.